Aug. 26, 1930.　　C. F. DRUMM, JR　　1,774,198
HELPER SPRING CONSTRUCTION
Filed Jan. 11, 1928
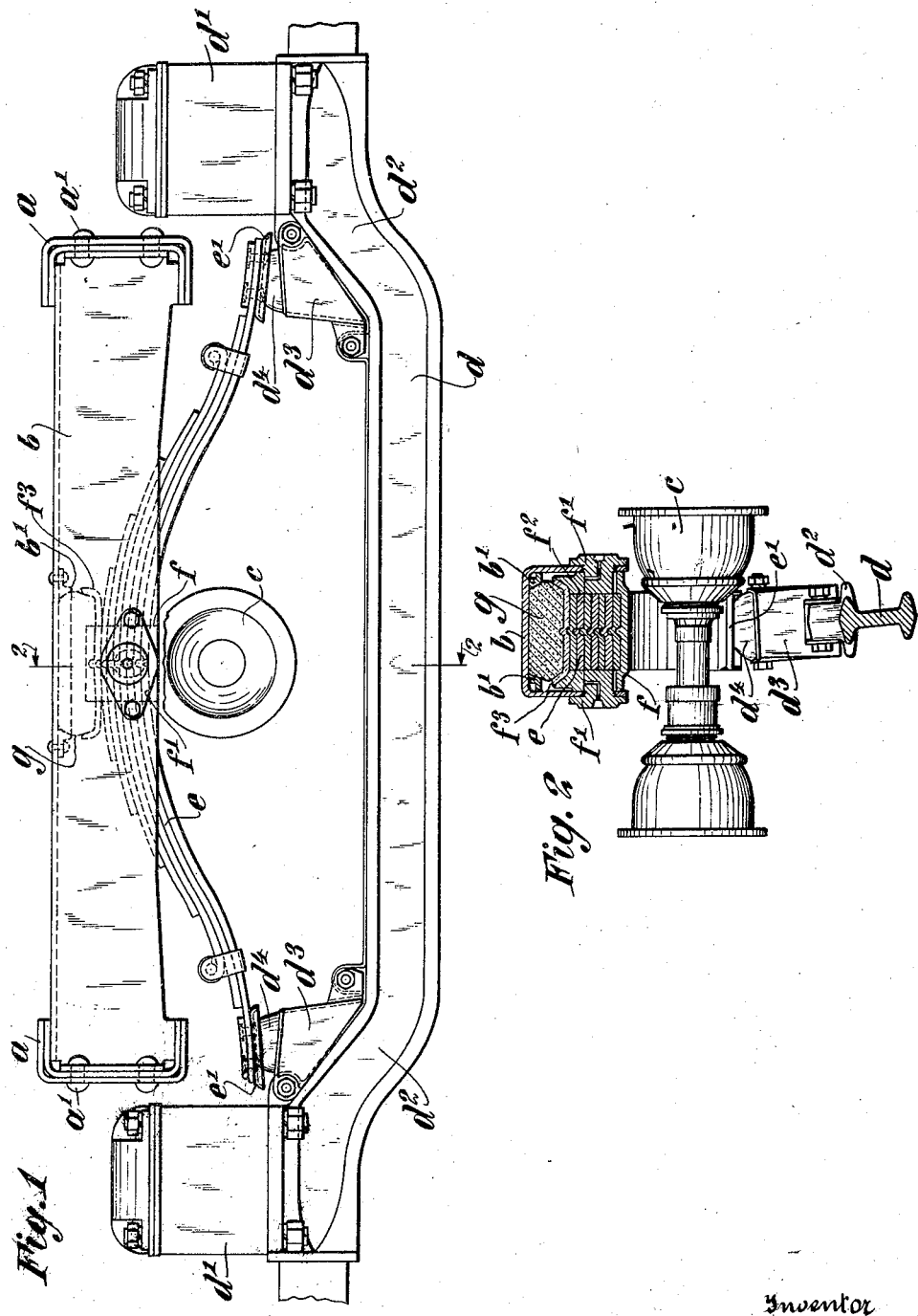

Patented Aug. 26, 1930

1,774,198

UNITED STATES PATENT OFFICE

CHARLES F. DRUMM, JR., OF NEW YORK, N. Y., ASSIGNOR TO INTERNATIONAL MOTOR COMPANY, OF NEW YORK, N. Y., A CORPORATION OF DELAWARE

HELPER-SPRING CONSTRUCTION

Application filed January 11, 1928. Serial No. 245,854.

The present invention relates to spring constructions which are designed for use as auxiliary springs when the main springs which support the frame upon the axles are loading to a perdetermined degree. Previous constructions of this character have utilized a form of leaf spring which usually has been mounted longitudinally of the frame and secured rigidly thereto at points such that the ends thereof will engage suitably positioned bearing surfaces upon the opposite frame or axle member when the load upon the main springs reaches a predetermined amount. These existing structures, mounting the helper spring rigidly as they do, have disregarded the characteristics of the helper springs and the service under which they function.

The present invention recognizes the desirability of mounting the helper spring so that it can carry the load impressed upon it most efficiently and provide a more serviceable construction which improves the riding qualities of the chassis. More particularly, the invention consists in the mounting of a transverse helper spring pivotally upon the frame and providing a cushioning means which yieldingly resists unequal forces at either ends of the spring. In this manner, the vehicle frame is enabled to maintain a more even ballast and stresses impressed upon the frame by the irregular tipping of the axle are diminished.

Further and other objects of the invention will be apparent as the description proceeds and reference will now be had to the accompanying drawings, wherein:

Figure 1 is a rear elevational view of a helper spring construction in accordance with the present invention.

Figure 2 is a view in section taken on line 2—2 of Figure 1, and looking in the direction of the arrows.

Referring to the drawings, $a$ indicates the frame members of a vehicle carrying an inverted U-shaped channel $b$. The channel may be secured at either ends to the frame by means of rivets $a'$ and at its central section carries a seat $b'$, the purpose of which will appear later. The propeller shaft and universal joint construction is indicated generally at $c$ and a rear axial at $d$. Housings $d'$ at either end of the axle are provided to receive suitable blocks of yielding non-metallic material for securing the ends of the springs. Although housings $d'$ have been illustrated as the means for securing the springs to the axle, this connection may take the form of a metallic one, such as in common use, either construction being adapted for the helper spring design embodied herein. As shown, the axle $d$ is provided with a cradle portion having angular sections $d^2$. Upon these sections, housings $d^3$ are secured, the housings being sectionalized so that one portion thereof may be removed in order to introduce a block of yielding non-metallic material $d^4$, such as rubber. When the rubber has been placed in position, the removable housing section is clamped on to secure the rubber under a predetermined degree of compression.

A transverse helper spring $e$ is provided, at its ends, with seats $e'$ which engage the protruding blocks of rubber $d^4$. At its median section the spring $e$ is pivoted upon the cross channel $b$ by means of a block $f$ and studs $f'$. The block $f$ is provided with a rectangular recessed portion $f^2$ to receive the spring $e$ and a seat $f^3$ is preferably welded to the side portions of the block $f$ after the spring has been inserted. This prevents the block $f$ from being removed from the spring. Under the side portions of the block $f$, oversized holes are provided to receive the inwardly projecting ends of the studs $f'$ which are screwed into the side portions of the inverted U-shaped channel $b$. These studs serve as trunnions upon which the block $f$ and spring $e$ are pivotally mounted and a slight vertical movement of the block with respect to the studs and channel is provided by reason of the oversized holes which provide a clearance between the under portions of the studs and the block $f$. Between the seats $f^3$ and $b'$, a block of yielding non-metallic material $g$ is provided. In installing the spring, this block of rubber is inserted and is of a size sufficient to cause it to be compressed to a desired degree when the parts are assembled.

From the above description, it will be apparent that when one end of the axle is tipped, the load upon the spring will not be carried by one half section only as would be the case if the spring were rigidly secured to the frame, but the load is equalized between the spring sections. The equalization of the load upon the spring is accompanied by the cushioning effect at the pivot point thereof by virtue of the cushioning element mounted between the pivoting element of the spring and the channel upon which the spring is mounted. This helper spring mounting enables the frame to maintain a more even keel and the riding qualities of the vehicle are bettered to an unusual degree.

The invention is not to be limited to specific elements or arrangement of parts because of the above description, the scope thereof being defined in the appended claims.

I claim as my invention:

1. A helper spring construction comprising an axle, a frame mounted upon the axle, means to mount a spring upon one of the members including means to permit a degree of movement of the mounting toward the said member, yielding non-metallic cushioning means between the spring and such member, and means to cause the spring to engage the other member at a plurality of points.

2. A helper spring construction comprising an axle, a frame mounted upon the axle, a U-shaped transverse channel carried by the frame, a spring, a block carried by the spring at the center thereof, means to pivot the block in the sides of the channel, means to permit a degree of movement of transportation of the block toward the channel, and means on the axle to engage the ends of the spring.

3. A helper spring construction comprising an axle, a frame mounted upon the axle, a U-shaped transverse channel carried by the frame, a spring, a block carried by the spring at the center thereof, means to pivot the block in the sides of the channel, means to permit a degree of vertical movement of the block with respect to the channel, cushioning means between the block and channel, and means on the axle to engage the ends of the spring.

4. A helper spring construction comprising an axle, a frame mounted upon the axle, a U-shaped transverse channel carried by the frame, a spring, a block carried by the spring at the center thereof, means to pivot the block in the sides of the channel, means to permit a degree of vertical movement of the block with respect to the channel, yielding non-metallic material between the block and channel to cushion vertical movements of the block, and means on the axle to engage the ends of the spring.

This specification signed this 9th day of January, A. D. 1928.

CHARLES F. DRUMM, Jr.